Nov. 8, 1966  J. A. FARRIS ETAL  3,283,902

FILTER UNIT HAVING RESERVE FILTER ELEMEMT

Filed Feb. 19, 1963  3 Sheets-Sheet 2

3,283,902
FILTER UNIT HAVING RESERVE FILTER ELEMENT

John A. Farris, Oyster Bay, Leslie Seawert, Glen Cove, and Bernard F. Silverwater, Plainview, N.Y., assignors to Pall Corporation, Glen Cove, N.Y., a corporation of New York
Filed Feb. 19, 1963, Ser. No. 259,500
8 Claims. (Cl. 210—90)

This invention relates to filter units having a reserve filter element which does not come into use until the primary filter element in the line of normal fluid flow becomes plugged, and thereafter when in use provides a normal filtrate flow.

In the course of time, every filter element becomes plugged, if allowed to remain in use long enough. Preventive maintenance requires that the filter element be serviced and cleaned or replaced before failure due to plugging, and ordinarily, to furnish flow in the event of emergency plugging before servicing, a reserve by-pass line is provided, with a relief valve arranged to open whenever the pressure differential across the filter element becomes sufficiently high.

Preventive maintenance, obviously, is of great importance in the case of aircraft, since a failure of the filter element due to plugging during flight can hardly be tolerated, in view of the disastrous consequences that may follow. With some fluids, such as Mil-L-7808 lubricating oil, the problem of plugging is particularly acute, since this fluid has a tendency to deposit a varnish on the filter, and in a long flight the hazard of plugging can become very great. A by-pass line is not always desirable, either, since the opening of the by-pass line admits unfiltered fluid into the system with consequential plugging of orifices and fluid passages, and excessive wear of pumps, valves, etc.

In accordance with the instant invention, this problem is resolved by providing a filter unit which includes two filter elements, the second of which remains in reserve, quite unused, until the first element becomes plugged. Both filter elements can be, but need not be, of the same standard of contaminant removal rating, and consequently the filtrate flow supplied through the second element after plugging of the first element can be of as high a quality as before. Furthermore, the second reserve filter element has a useful life expectancy which is more than sufficient under normal operating conditions until the unit can be serviced.

The filter unit of the invention comprises a filter housing having inlet and outlet passages communicating respectively with the exterior of the primary filter element and the interior of the secondary filter element. The secondary reserve filter element is entirely separated from the primary element, in such a manner that normal flow bypasses the secondary element. A relief valve is interposed in the inlet passage, and is adapted to open at a predetermined pressure differential between the inlet and outlet passages across the primary filter element, and when opened opens a direct line from the inlet passage to the secondary filter element, by-passing the primary filter element. Thus, whenever the primary filter element becomes plugged, the relief valve opens, admitting fluid flow from the inlet to proceed to and through the secondary reserve filter element, whence it can proceed to the outlet passage, and thereafter resume the normal line of filtrate flow in the system.

Figure 1:
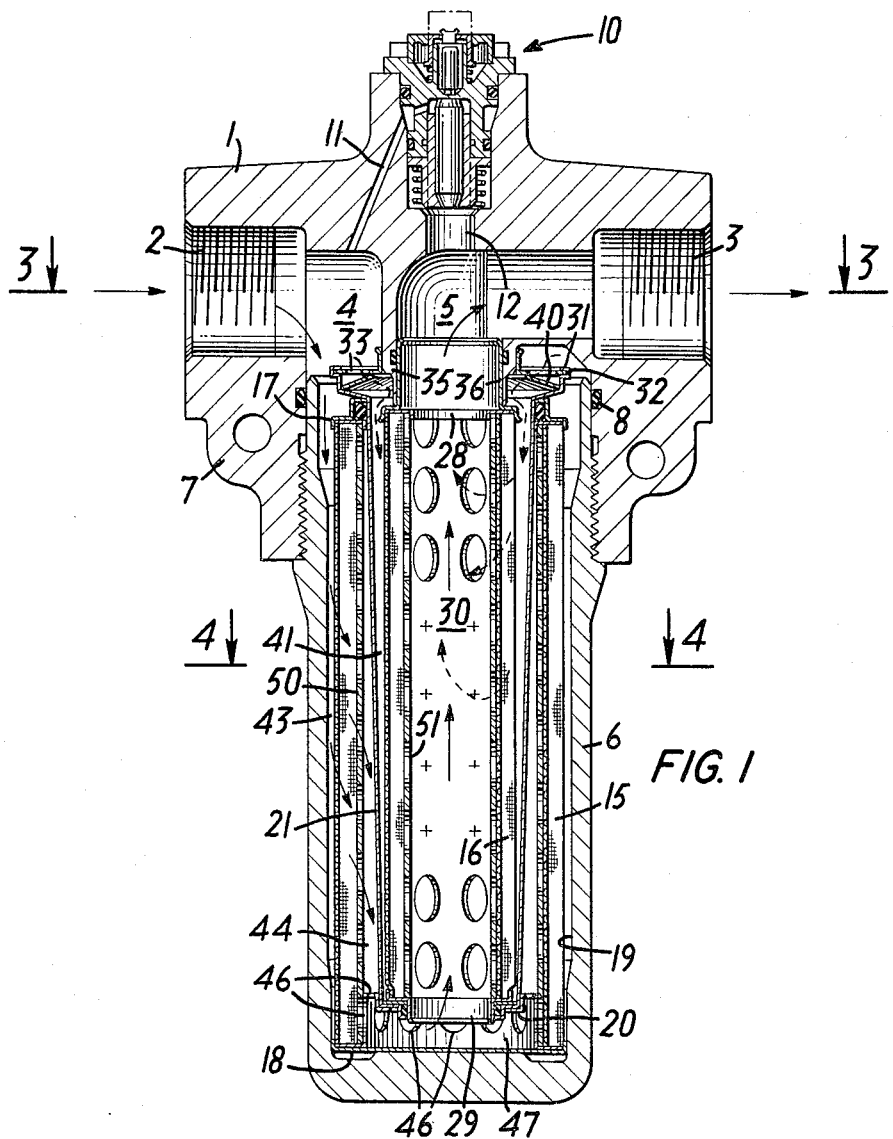
FIGURE 1 is a longitudinal view in section of a filter unit in accordance with the invention.

FIGUURE 4 is a cross-sectional view through the filter bowl of the filter unit of FIGURE 1, taken along the plane 4—4 and looking in the direction of the arrows.

Figure 5:
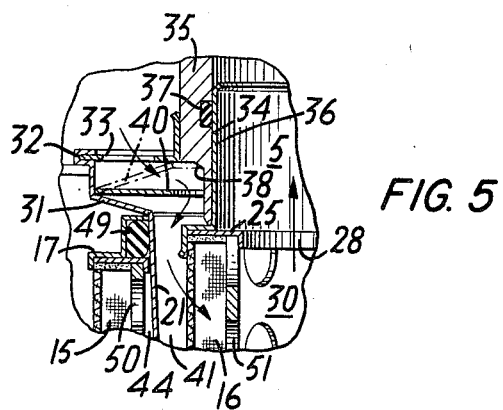

FIGURE 5 is an enlarged view of the upper portions of the primary and secondary reserve filter elements, showing the means of separation and support of the two in the unit, and showing the line of emergency of reserve flow when the primary filter element is plugged and the relief valve has opened to allow flow to proceed through the secondary reserve element.

Figures 6, 7:
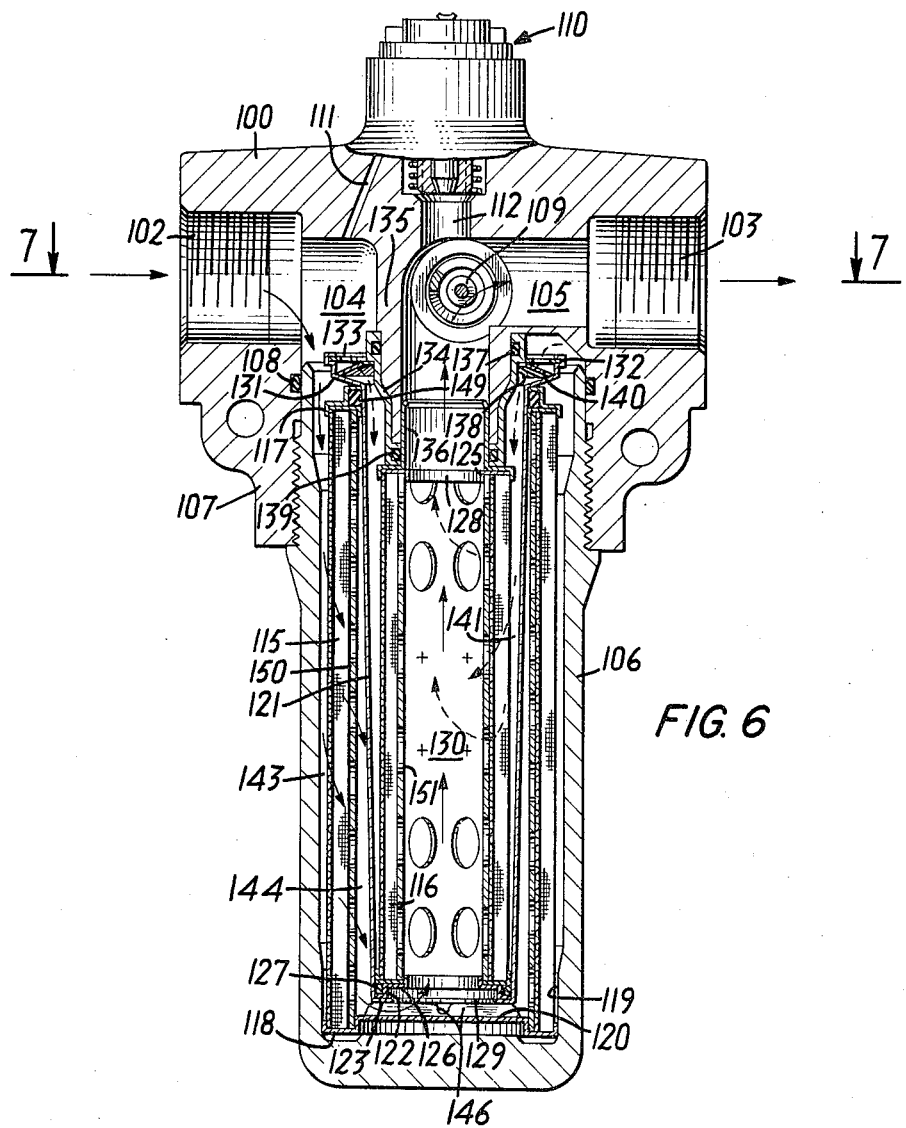

FIGURE 6 is a longitudinal view in section of another embodiment of filter unit in accordance with the invention.

FIGURE 7 is a cross-sectional view through the head of the filter unit of FIGURE 6, taken along the plane 7—7, and looking in the direction of the arrows.

The filter unit of FIGURES 1 to 5, inclusive, comprises a head 1, made of aluminum alloy, but which can be made of any metal or plastic material, having an inlet port 2 and an outlet port 3 leading respectively to internal inlet passage 4 and outlet passage 5, both of which open into the interior of a filter bowl 6 attached by external threads to the correspondingly internally threaded downward extension 7 of the filter head. The O-ring 8 ensures a fluid-tight seal between the bowl and the head.

At the top of the head is a differential pressure indicator 10, which can be of any desired type, but which as shown is of the magnetic type described and claimed in U.S. Patent No. 2,942,572. Fluid connections to the flow passages are provided by passages 11 and 12, leading from inlet passage 4 and outlet passage 5, respectively, so as to enable the pressure indicator to respond to pressure differences between the two passages, and thus to detect and indicate whenever the pressure differential between the two passages across either of the filters in the unit exceeds a predetermined minimum. The pressure differential at which the indicator gives a signal is arranged in conjunction with the opening of the reserve line, as will be apparent from the ensuing discussion.

Figure 4:
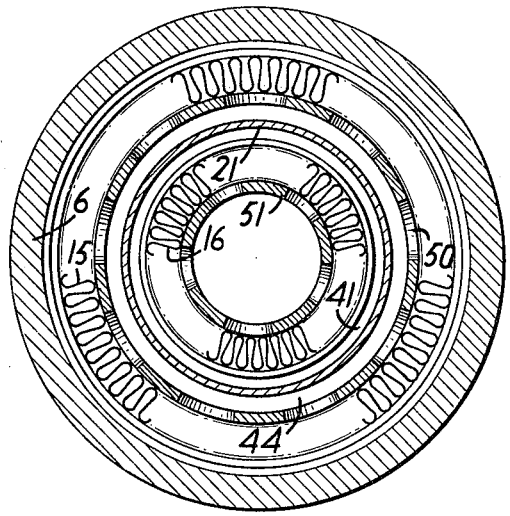

Disposed in the filter bowl 6 are an outer cylindrical filter element 15 and a concentric inner cylindrical filter element 16. The outer element 15 is the primary filter element, and is employed in normal flow. The inner filter element 16 is the secondary reserve filter element, and is kept in reserve, quite unused, until the primary element 15 has become plugged, or fails to permit flow through in sufficient volume for some other reason. Both filter elements are of wire mesh, as shown in the drawing, and are corrugated, as is best seen in FIGURE 4. Unsintered wire mesh is employed for the outer element 15, and sintered wire mesh for the inner element 16, made as described and claimed in U.S. Patents Nos. 2,925,650 and 3,049,796, but any filter medium can be used for either element such as paper, glass fiber mat, or cloth, sintered metal powder filters such as the porous stainless steel of U.S. Patent No. 2,554,343, resin-impregnated or coated paper, and ceramic filters.

Figure 2:
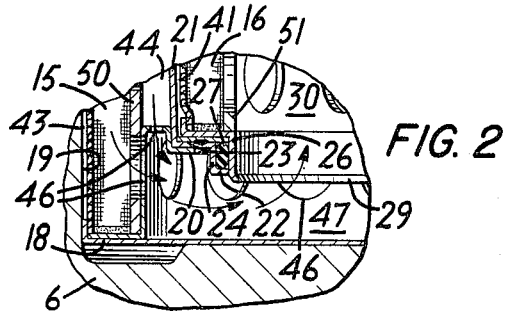
FIGURE 2 is an enlarged view of the lower portions of the primary and secondary reserve filter elements, showing the means of separation and support of the two in the unit, so that the line of normal filtrate flow from the primary element by-passes the secondary reserve element.
Figure 3:
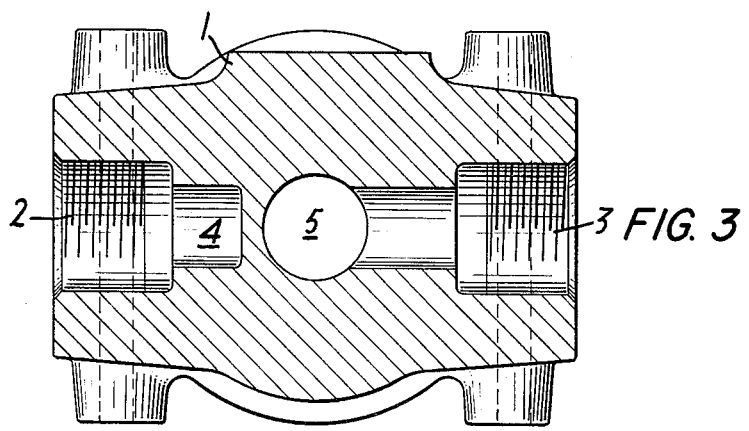
FIGURE 3 is a cross-sectional view through the head of the filter unit of FIGURE 1, taken along the plane 3—3, and looking in the direction of the arrows.

The corrugated outer filter element 15 is retained between upper and lower end caps 17 and 18. The lower end cap 18, as is best seen in FIGURE 2, rests upon the bottom of the filter bowl, and is adapted to fit tightly against the inside wall 19 at the bottom of the bowl, for proper placement and support of the outer filter element 15 in the bowl. The lower cap 18 has an upwardly extending inner flange, and is so dimensioned as to center the element 15 in the bowl, and this flange ends in a horizontal ledge 20 carrying a number of openings 46. This ledge serves as a support for a cannister 21 disposed concentrically between the primary and secondary filter element, and having an open top and an open bottom, and having non-perforated fluid-tight walls, flared outwardly towards the top. The outward flare of the walls provides a space 41 between the cannister and the secondary filter element 16, which is wider at the top than at the bottom, and a space 44 between the cannister 21 and the primary filter element 15 which gradually increases in size towards the bottom of the cannister. The lower portion of the cannister 21 is provided with an inwardly turned horizontal flange, ending in a stepped ledge 22, the top of which is closed with the annular plate 23 which defines therewith an annular cavity 24. The plate 23 serves as a support for the secondary filter element 16. The ledge 20 (which is part of the end cap 18) the cannister 21, and the end cap 26 are separate, but dependent upon one another for support and/or sealing.

The corrugated inner filter element 16 has its corrugations supported between upper and lower end caps 25–36 and 26, respectively, and the annular cavity 24 is so dimensioned as to hold the lower end cap 26 tightly in position within the tubular cannister 21. An O-ring 27 ensures a leakproof seal between the cannister 21 and the end cap 26. Each of the end caps 25–36 and 26 is provided with a central aperture, 28 and 29, respectively, furnishing access to the central passage 30 enclosed by the secondary filter element 16.

Both of filter elements 15 and 16 have internal support in the form of cylindrical perforated cores 50 and 51, respectively, made of stainless steel, but any structural metal can be used. Any other suitable support can be used, such as a metal spring, a perforated cardboard tube, and the like.

The top end of the cannister 21, as is best seen in FIGURE 5, is provided with an outwardly and upwardly extending flange 31 whose end is spun over to capture ring 33 in groove 32. The ring 33 is pierced by a series of holes to provide fluid access to the Belleville spring valve 40 and holds the cannister 21 in position at the lower end of passage 4, with a nominal clearance of a few thousandths of an inch between ring 33 and the exterior or downward extension 35 of the head. This permits an insignificant leakage which is filtered by the reserve element 16 and can be sealed completely by introducing an O-ring seal in place of the nominal clearance. The lower face of flange 31 engages the inner periphery of the top end cap 17 of the primary filter element, and the O-ring 49 ensures a leakproof seal therebetween.

A downward extension 35 of the head encloses the outlet passage 5. The top end 36 of end cap 25 is disposed in the end of passage 5, fitting closely against the wall of the head, and thus holds filter element 16 in position at the end of outlet passage 5. A leakproof seal between the wall 34 and the upper part 36 of the end cap 25 is ensured by the O-ring 37. The flange 31 of cannister 21 together with the lower face of the ring 33 serves as a support for a Belleville spring valve 40, which serves as a relief valve assembly to control flow from the inlet passage 4 to the secondary filter element 16.

The spring valve when in the closed position, shown in FIGURE 1, provides a fluid-tight barrier to fluid flow between the passage 4 and the space 41 between the cannister 21 and the secondary filter element 16. Consequently, in this position all fluid (except for valve leakage) flowing through inlet passage 4 is directed into the space 43 between the inner wall 19 of the filter bowl and the outside of the primary filter element 15. The normal line of such fluid flow is shown in the solid line.

When the spring valve is in the open position, shown in FIGURE 5, the fluid is free to enter the space 41 between the inside of the cannister 21 and the secondary filter element 16. As is evident from FIGURE 5, the Belleville spring valve is adapted to open at its inner periphery, and to open to its maximum opening position whenever a predetermined pressure differential is exceeded between the passage 4 and outlet passage 5, which communicates through the secondary filter element to the spacer 41. The resulting reserve line of fluid flow is shown in the dashed line.

The operation of the filter is as follows. Normal flow of fluid to be filtered (shown in solid line) enters the filter head at inlet port 2, and passes through inlet passage 4, around the flange 31, and enters the space 43, whence it flows through the primary filter element 15. The filtrate enters the space 44 on the outside of the cannister 21, and then flows through one of the openings 46 in the ledge portion 20 of the end cap 18, into the space 47 at the bottom of the filter bowl. It then flows through the opening 29 in the end cap 26 of the secondary filter element 16, entering the central passage 30, whence it flows through the outlet passage 5 of the head, and leaves the filter unit at the outlet port 3.

The flow continues in this way until the primary filter element 15 becomes plugged, due, for example, to the development of a deposit or varnish on the filter surface. When the primary filter element becomes plugged, the pressure in outlet passage 5 drops to considerably less than the pressure in inlet passage 4, and the differential pressure required to open the Belleville spring valve 40 is exceeded, and the valve open. When the Belleville spring valve has opened, the flow of fluid then continues, but now it passes the Belleville spring valve and enters the space 41 on the inside of the cannister 21, whence it enters the secondary filter element 16, emerging into the central passage 30 as before, and leaves the filter unit via passage 5 and port 3. Thus, a normal filtered flow is maintained, despite the plugging of the primary filter element.

The pressure indicator 10 is arranged to give a signal indicating failure of the primary element at a pressure differential across the primary filter element a little less than or the same as that at which the Belleville spring valve opens. As soon as the Belleville spring valve has opened, however, the pressure differential is restored to normal. The pressure indicator thus should not reset automatically so that the service operator will know that the primary element was by-passed, and give a continuous indication that servicing of the primary element is necessary. Normally, however, there will be a sufficient time to take appropriate servicing action before failure of the secondary element, since the life expectancy of the secondary element is more than sufficient under normal operating conditions.

Inasmuch as the secondary reserve filter element must withstand any pressure differentials which may be developed within the system, beyond those actuating the Belleville spring valve, it usually is preferred to provide as strong a filter element for this position as for the primary filter element.

It will of course be understood that any type of filter element can be employed for the primary and secondary reserve filter elements, as the system may require. Furthermore, the filter element need not be in corrugated form, although this is desirable because higher dirt capacity and higher filtrate flow rate result from the greater surface area of the element, thus providing a greater surface area for flow through in a small envelope.

Any type of relief valve can be used in place of the Belleville spring valve, such as a poppet and spring type valve.

The Belleville spring valve of the invention is in the form of a disk bowed against the direction of flow and which opens fully at a predetermined pressure differential. The flow-through required is provided by so dimensioning the disk and valve seat as to give an annular opening of the predetermined flow capacity when the valve cracks open. Disk thickness, amount of bow, disk diameter and annular opening diameter are determined by the pressure differential to be resisted, i.e., the resistance to be offered by the spring action of the disk, and the flow capacity needed at a given pressure differential.

The spring disk of the invention is made of material of high yield strength and high hardness. Materials having minimum yield strengths of 30,000 to 250,000 p.s.i.g can be used, with Rockwell hardness of the order of C–45. Steel, stainless steel, and nickel chromium alloys are satisfactory, as also are certain synthetic resins such as polytetrafluoroethylene and polyoxymethylene. Metal spring disks of the desired type are available, and are known as Belleville washers.

The disk can be uniform in thickness throughout or can vary in thickness, thinner at the center than at the edge, to give improved flexing and sealing.

Fluid flow conditions of all kinds can be met by appropriate design of the spring disk to any load-deflection characteristics required in the system. The geometry of these disks is established by the disks' outside diameter and inside diameter, its free height measured from the plane of the inside edge (along the perpendicular to the plane of the outside edge) and its thickness. Proper selection of the geometry, using mathematical tables and equations of Fortini, Machine Design, September 4, 1958, "Conical-Disc Springs" will give a valve capable of pressure-relieving response to any type of load in any desired way.

The filter unit of FIGURES 6 and 7 comprises a head 100, made of aluminum alloy, but which can be made of any metal or plastic material, having an inlet port 102 and an outlet 103 leading respectively to internal inlet passage 104 and a central outlet passage 105, both of which open into the interior of a filter bowl 106 attached by external threads to the correspondingly internally threaded downward extension 107 of the filter head. The O-ring 108 ensures a fluid-tight seal between the bowl and the head. A relief valve 109 placed off center, to one side of passage 105, closes off a peripheral internal passage 101 connecting passages 104 and 105.

At the top of the head and disposed axially of passage 105 is a differential pressure indicator 110, which can be of any desired type, but which as shown is of the magnetic type described and claimed in U.S. Patent No. 2,942,572. Fluid connections to the flow passages are provided by passages 111 and 112, leading from inlet passage 104 and outlet passage 105, respectively, so as to enable the pressure indicator to respond to pressure differences between the two passages, and thus to detect and indicate whenever the pressure differential between the two passages across either of the filters in the unit exceeds a predetermined minimum. The pressure differential at which the indicator gives a signal is arranged in conjunction wtih the opening of the reserve line, as will be apparent from the ensuing discussion.

Disposed in the filter bowl 106 are an outer filter element 115 and a concentric inner filter element 116. The outer element 115 is the primary filter element, and is employed in normal flow. The inner filter element 116 is the secondary reserve filter element, and is kept in reserve, quite unused, until the primary element 115 has become plugged, or fails to permit flow through in sufficient volume for some other reason. Both filter elements are of wire mesh, as shown in the drawing, and are corrugated, similar to those of FIGURE 4. Unsintered wire mesh is employed for the outer element 115, and sintered wire mesh for the inner element 116, made as described and claimed in U.S. Patents Nos. 2,925,650 and 3,049,796, but other materials can be used, as noted above.

The corrugated outer filter element 115 is retained between upper and lower end caps 117 and 118. The lower end cap 118, as in the element of FIGURE 2, rests upon the bottom of the filter bowl 106, and is adapted to fit tightly against the inside wall 119 at the bottom of the bowl, for proper placement and support of the filter element 115 in the bowl. The lower cap 118 has an upwardly and inwardly turned flange, and has a center ledge 120 containing a number of protrusions 146. These protrusions serve as a support for a cannister 121 disposed between the primary and secondary reserve filler elements, and having an open top and an open bottom, and having non-perforated fluid-tight walls, flared outwardly towards the top. The outward flare of the walls provides a space 141 between the cannister and the secondary reserve filter element 116, which is wider at the top than at the bottom, and a space 144 between the cannister 121 and the primary filter element 115 which gradually increases in width towards the bottom of the cannister. The lower portion of the cannister 121 rests on the protrusions 146 of the lower end cap 118. The space between the protrusions 146 provide a flow path from space 144 between the bottom ledge of canister 121 and the center ledge 120 or the end cap 18 to the central aperture 129 of the secondary element. The protrusions 146 also serve as a support for the secondary reserve filter element 116. As shown, the protrusions 146 support the lower end cap 126 of the secondary element 116.

The corrugated inner filter element 116 has its corrugations supported between upper and lower end caps 125 and 126, respectively. The lower end cap 126 has affixed thereto an external plate 122 whose outer end is turned to form a flange 123 which captures O-ring 127 between it and the end cap 126, and thus ensures a leakproof seal between the cannister 121 and the end cap 126. Each of the end caps 125 and 126 is provided with a central aperture, 128 and 129, respectively, furnishing access to the central passage 130 enclosed by the secondary reserve filter element 116.

Both of filter elements 115 and 116 have internal support in the form of cylindrical perforated cores 150 and 151, respectively, made of stainless steel, but any other material may be used, as mentioned above.

The top end of the cannister 121 is provided with an outwardly and upwardly extending flange 131 whose end is spun over to capture ring 133 part of tubular member 134 in groove 132. The ring 133 is pierced by a series of holes to provide fluid access to Belleville spring washer 140 and holds the cannister 121 tightly in position at the lower end of passage 104, and fits against the tubular member 134 enclosing the lower portion of the downward extension 135 of the head. The lower face of flange 131 engages the inner periphery of the top end cap 117 of the primary filter element, and the O-ring 149 ensures a leakproof seal therebetween.

The top of the end cap 125 and the upper portion 136 form a ledge which receives the lower end of member 134, and support it and with it ring 133 in the position shown.

The downward extension 135 of the head encloses the outlet passage 105. The top end 136 of end cap 125 is disposed in the end of passage 105, fitting closely against the wall of the head, and thus holds filter element 116 in position at the end of outlet passage 105. A leakproof seal between member 134, extension 135 and the end cap 125 is ensured by the O-ring 137 and 139, which fit in corresponding grooves of member 134. The outer wall of member 134 below the ring 133 is formed with a shoulder 138, and this together with the lower face of the ring 133 serve as a support for a Belleville spring valve 140, which serves as a relief valve assembly to control flow from the inlet passage 104 to the secondary reserve filter element 116. The outer periphery of the valve 140 is seated against the flange 131 of the cannister 121.

The spring valve when in the closed position, as shown in FIGURE 6, provides a barrier to fluid flow between the passage 104 and the space 141 between the cannister 121 and the secondary reserve filter element 116. Consequently, in this position all fluid (except for valve leakage) flowing through inlet passage 104 is directed into the space 143 between the inner wall 119 of the filter bowl 106 and the outside of the primary filter element 115. The normal line of such fluid flow is shown in the solid line.

When the spring valve is in the open position, shown in dashed lines in FIGURE 6, the fluid is free to enter the space 141 between the inside of the cannister 121 and the secondary filter element 116. As is evident from FIGURE 6, the Belleville spring valve in this embodiment is adapted to snap fully open at its inner periphery and open to its maximum opening position whenever a predetermined pressure differential is exceeded between the passage 104 and outlet passage 105, which communicates through the secondary reserve filter element to the space 141. The resulting reserve line of fluid flow is shown in the dashed line.

The operation of the filter is as follows. Normal flow of fluid to be filtered (shown in solid line) enters the filter head at inlet port 102, and passed through inlet passage 104, around the flange 131, and enters the space 143, whence it flows through the primary filter element 115. The filtrate enters the space 144 on the outside of the cannister 121, and then flows between the protrusions 146 in the ledge portion 120 of the end cap 118, into the opening 129 in the end cap 126 of the secondary filter element 116, entering the central passage 130, whence it flows through the outlet passage 105 of the head, and leaves the filter unit at the outlet port 103.

The flow continues in this way until the primary filter element 115 becomes plugged, due, for example, to the development of a deposit or varnish on the filter surface. When the primary filter element becomes plugged, the pressure in outlet passage 105 drops to considerably less than the pressure in inlet passage 104, and the relief valve 109 is set to open at a higher pressure differential between passages 104 and 105 than is the Belleville spring valve 140 so that when the differential pressure reaches the valve required to open the Belleville spring valve 140, the valve snaps open. When the Belleville spring valve 140 has snapped open, the flow of fluid continues, but now it passes the Belleville spring valve and enters the space 141 on the inside of the cannister 121, whence it enters the secondary reserve filter element 116, emerging into the central passage 130 as before, and leaves the filter unit via passage 105 and port 103. Thus, a normal filtered flow is maintained, despite the plugging of the primary filter element.

When the secondary reserve element becomes plugged, and the pressure differential reaches the minimum required to open the relief valve 109 flow continues via passage 101 between passages 104 and 105, by-passing both filter elements.

The pressure indicator 110 is arranged to give a signal indicating failure of the primary element 115 at a pressure differential across the primary filter element a little less than or the same as that at which the Belleville spring valve snaps open. As soon as the Belleville spring valve has opened, however, the pressure differential is restored to normal. When this course, the pressure indicator in this case can be set to remain in the tripped position, as in the embodiment of FIGURES 1 to 5. The fact that a signal has been given indicates to the operator that the primary element or both primary and secondary elements have failed, and that the device must be serviced shortly. By-pass flow is normally provided by relief valve 109 and line 101, and there will be sufficient time to take appropriate servicing action before failure of the system due to lack of filtered flow.

The following is claimed:

1. A filter assembly comprising, in combination, a housing having an inlet and an outlet, a primary filter element disposed in the housing; a primary passage leading from the inlet to the primary filter element; a secondary reserve filter element fixed in relation to the primary filter element, and disposed in the housing; a secondary passage communicating with the inlet and the secondary filter element; a relief bypassing passage in the housing connecting the inlet and the outlet; a fluid flow separating means disposed between and spaced from the primary and secondary filter elements, preventing flow between the primary and secondary filter elements; a valve comprising a self-closing fluid pressure-responsive spring disk disposed across the secondary passage, and normally closing off flow to the secondary filter element therethrough, but responsive to a predetermined pressure differential across the primary filter element to open and allow flow through the secondary passage, bypassing the primary filter element, to the secondary filter element; and a second fluid pressure-responsive self-closing relief valve disposed across the relief passage, responsive to a predetermined pressure differential between the inlet and the outlet, to open and allow flow through this passage bypassing both the primary and secondary filter elements whenever the predetermined pressure differential thereacross is exceeded.

2. A filter assembly in accordance with claim 1 in which the separating means is in the form of a cannister, concentric to and supporting the secondary filter element, and having an aperture at the bottom end of the cannister, opening into the interior of the secondary filter element.

3. A filter assembly in accordance with claim 1 in which the primary filter element and the secondary reserve filter element are made of paper.

4. A filter assembly in accordance with claim 1 in which the primary filter element and the secondary reserve filter element are made of wire mesh.

5. A filter assembly in accordance with claim 1 in which the filter elements are made of sintered wire mesh.

6. A filter assembly in accordance with claim 1 including a differential pressure indicator for detecting and indicating a pressure differential across the primary filter element, greater than a predetermined minimum.

7. A filter assembly in accordance with claim 1 in which the first relief valve is in the form of a spring disk valve.

8. A filter assembly in accordance with claim 1 in which the primary and secondary reserve filter elements are concentric and cylindrical, the primary element being the outer element and the secondary element being the inner element.

References Cited by the Examiner
UNITED STATES PATENTS

| | | | |
|---|---|---|---|
| 2,617,535 | 11/1952 | Hamilton | 210—132 |
| 2,998,138 | 8/1961 | Mould et al. | 210—315 |
| 3,040,894 | 6/1962 | Pall | 210—90 |
| 3,120,490 | 2/1964 | Samson | 210—132 |
| 3,164,164 | 1/1965 | Pall et al. | 251—75 X |
| 3,216,571 | 11/1965 | Whiting et al. | 210—315 X |

REUBEN FRIEDMAN, *Primary Examiner.*

F. A. SPEAR, *Assistant Examiner.*